United States Patent [19]

Tobias

[11] Patent Number: 5,622,579
[45] Date of Patent: Apr. 22, 1997

[54] METHOD FOR ATTACHMENT OF A SERVICE DEVICE TO A CONTAINER

[75] Inventor: John W. Tobias, Lancaster, Pa.

[73] Assignee: Graham Packaging Corporation, York, Pa.

[21] Appl. No.: 414,646

[22] Filed: Mar. 31, 1995

[51] Int. Cl.⁶ .................................................. B32B 31/16
[52] U.S. Cl. ....................... 156/73.1; 156/285; 156/292; 156/308.4; 156/580.1; 264/445
[58] Field of Search .................... 156/69, 73.1, 290, 156/308.4, 580.1, 580.2, 242, 245, 285, 292, 382; 264/442, 443, 445; 425/174.2

[56] References Cited

U.S. PATENT DOCUMENTS

| | | | |
|---|---|---|---|
| 4,273,246 | 6/1981 | Thompson | 215/100 A |
| 4,280,859 | 7/1981 | Thompson | 156/73.5 |
| 4,293,359 | 10/1981 | Jakobsen | 156/156 |
| 4,368,826 | 1/1983 | Thompson | 215/100 A |
| 4,372,454 | 2/1983 | Thompson | 215/100 A |
| 4,560,430 | 12/1985 | Watanabe et al. | 156/285 |
| 4,647,325 | 3/1987 | Bach | 156/73.1 |
| 4,726,480 | 2/1988 | Hagan | 215/232 |
| 4,726,481 | 2/1988 | Hagan | 215/232 |
| 4,746,025 | 5/1988 | Krautkramer | 215/232 |
| 4,954,191 | 9/1990 | Delespaul et al. | 156/69 |
| 5,040,357 | 8/1991 | Ingemann | 53/478 |
| 5,110,041 | 5/1992 | Keeler | 229/125.15 |
| 5,244,520 | 9/1993 | Gordon et al. | 156/73.1 |
| 5,256,225 | 10/1993 | Dwinell | 156/73.1 |
| 5,275,767 | 1/1994 | Micciche | 246/442 |
| 5,304,265 | 4/1994 | Keeler | 156/64 |
| 5,316,603 | 5/1994 | Akazawa et al. | 156/69 |

Primary Examiner—David A. Simmons
Assistant Examiner—J. Sells
Attorney, Agent, or Firm—Howson and Howson

[57] ABSTRACT

A method for attaching a service device, such as a plastic handle, to a flexible container sidewall, and a container prepared by the method. The inside of the container is supported rigidly to effect a strong bond between the container and the handle.

12 Claims, 6 Drawing Sheets

METHOD FOR ATTACHMENT OF A SERVICE DEVICE TO A CONTAINER

FIELD OF THE INVENTION

The present invention relates to a method for attaching a service device to a blown plastic container, and more particularly, the present invention relates to the use of ultrasonic welding horns to form a bond between a separate plastic handle and the flexible sidewall of a blown PET container.

BACKGROUND OF THE INVENTION

The use of blow molded plastic containers has become very commonplace in packaging beverages, such as juice. Blow molded plastic PET containers are particularly useful in the so-called "hot-fill" process, i.e. filling the containers with beverages at an elevated temperature, sealing the containers, and then allowing the beverage to cool. Blow molded plastic PET containers provide a package with sufficient flexure to compensate for the changes of pressure and temperature, while maintaining structural integrity and aesthetic appearance. In addition, the plastic used in the containers can be recycled. The production of commercial quantities of such containers can be done efficiently, quickly, and at a minimum of cost.

Smaller containers generally do not need handles because a consumer can grasp the sides of the container. However, larger containers, such as gallon containers, may require some form of handle in order for a consumer to control the container while carrying or pouring its contents. Some containers, such as milk bottles have handles blow molded integral with the container.

The attachment of separate handles onto blow molded PET containers presents a series of problems. The attachment must be strong enough so that it does not become detached either during the hot-fill process, or during transportation and handling. The attachment must be strong enough so that a consumer can lift and maneuver the container even in its completely filled condition. The container and handle should use a minimum of plastics to be cost effective. Finally, the attachment must provide an aesthetic appearance to the consumer.

There are several known methods of attaching separate handles to plastic blow-molded PET containers. Adhesives have been used to connect the handle to the container. Blow molded containers have been blown around portions of separate handles to connect the handle to the container. Handles have included straps which gird around the container sidewall and/or the container neck.

Ultrasonic welding horns have been used in the bottle art to bond various surfaces together. For instance, U.S. Pat. No. 5,275,767 relates to connecting the base of a container to a container sidewall; U.S. Pat. Nos. 5,256,225, 5,244,520, 4,726,481, and 4,746,025 relate to connecting nozzles, spouts and neck inserts to containers; and U.S. Pat. Nos. 5,040,357, 4,954,191, and 5,316,603 relate to connecting lids, covers or seals to containers.

Ultrasonic welding of a portion of a separate handle to a plastic container sidewall is disclosed in U.S. Pat. Nos. 4,273,246, 4,280,859, 4,368,826 and 4,372,454. A top portion of an L-shaped handle snaps onto the container neck and a bottom portion of the handle engages the container sidewall and can be attached with the use of ultrasonic welding.

Several problems exist which prevent effective bonds from being created between a separate handle and a blow molded plastic PET container, especially taking into account the size and weight of the container and the requirement that the bond be strong enough to resist detaching. The sidewall of a blow molded PET plastic container is flexible, and is required to be flexible in order to be used in the hot-fill process to compensate for changes in temperature and pressure. An ultrasonic welding horn typically vibrates in a range of some 20,000 cycles per second to effect melting of the surfaces of the two connecting parts. A significant degree of rigidity between the two connecting parts is needed in order to allow a bond to occur which will be strong enough to resist detachment when a gallon of liquid is lifted and poured.

Although various ones of the referenced containers may function satisfactorily for their intended purposes, there is a need for a blow molded plastic PET container and a separately attached service device, or handle, which is capable of being bonded together to resist separation even under the stresses imposed during handling and pouring a gallon of liquid. A method for attaching the handle and container with the use of ultrasonic welding horns is needed in which commercial quantities of bottles and attached handles can be produced efficiently, at a minimum of cost, and having superior aesthetic appearance.

OBJECTS OF THE INVENTION

With the foregoing in mind, a primary object of the present invention is to provide a novel method for attaching a separate plastic service device to a blow molded plastic PET container.

Another object of the present invention is to provide a method of attaching a handle to a container which effectively uses an ultrasonic welding horn to form a bond.

A further object of the present invention is to provide a means for rigidly supporting together in abutting fashion a handle and container sidewall to allow an effective bond to be created between the handle and container sidewall with the use of ultrasonic welding.

A still further object of the present invention is to produce by a process using ultrasonic welding horns, containers which are structurally sound, inexpensive to produce, and aesthetically appealing.

SUMMARY OF THE INVENTION

More specifically, the present invention is a method for ultrasonic welding a plastic attachment to a plastic container. The plastic container has an interior surface and an exterior surface. The plastic attachment is engaged against a portion of the exterior surface of the plastic container. Prior to welding, the interior surface of the flexible sidewall of the container is held in a rigid condition.

The ultrasonic welding horn is used as part of a delivery positioning mechanism which brings and supports the handle at the appropriate place on the exterior surface of the container sidewall for welding. The rigidly supported container and handle are efficiently welded together with ultrasonic energy. A strong bond is created due to the rigidness of the support between the handle and container.

One embodiment of rigidly supporting the container for ultrasonic welding is by placing the container in a dummy mold cavity having space for the handle and ultrasonic welding horn to be engaged against the exterior surface of the container sidewall. Just prior to sounding the horns the bottle is pressurized with air while being constrained in the dummy mold. When the horns are activated, the air pressure produces sufficient back pressure on the interior surface of the container sidewall to allow an effective weld to be created between the flexible container sidewall and the separate handle.

An alternate embodiment for maintaining rigidity between the flexible sidewall of the container and the separate handle uses a back-stop which is extended into the container and then engaged against the interior surface of the container sidewall adjacent to the placement of the plastic attachment along the outer portion of the container sidewall. When the welding horns sound, the inserted support provides sufficient back pressure along the container sidewall to effect the formation of a strong bond.

The invention also includes a container having an attached separate handle which is produced by the above-stated method.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED METHOD

Figure 1:
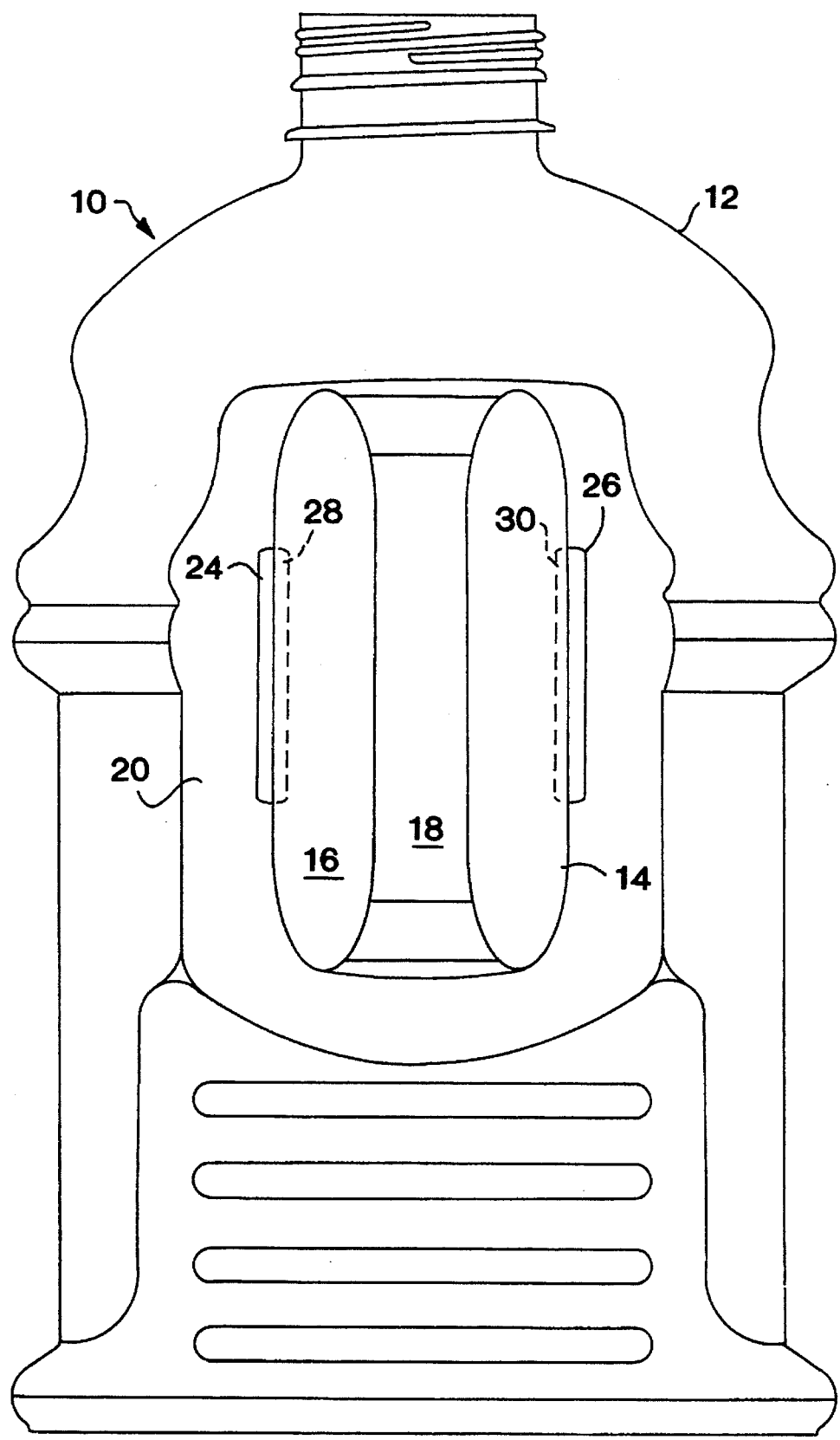
FIG. 1 is a front elevational view of a container having a handle produced by the method of the present invention.

Turning now to the drawings, FIG. 1 illustrates a container 10 produced from a method according to the present invention. A container body 12 as shown, was produced separately in a conventional blow molding operation. The configuration of the container body 12, as shown, is a gallon size. However, other container sizes are capable of use with the method of the present invention as well as other types of flexible packaging products. In the disclosed method, the blow molded container body 12 is made of plastic PET material, enabling it to be fully recyclable, aesthetically appealing, and be utilized in hot-fill processes. The container 10 has a finish which provides a closeable pouring port which is smaller in transverse cross-section than the sidewall of the container body 12.

Figure 2:
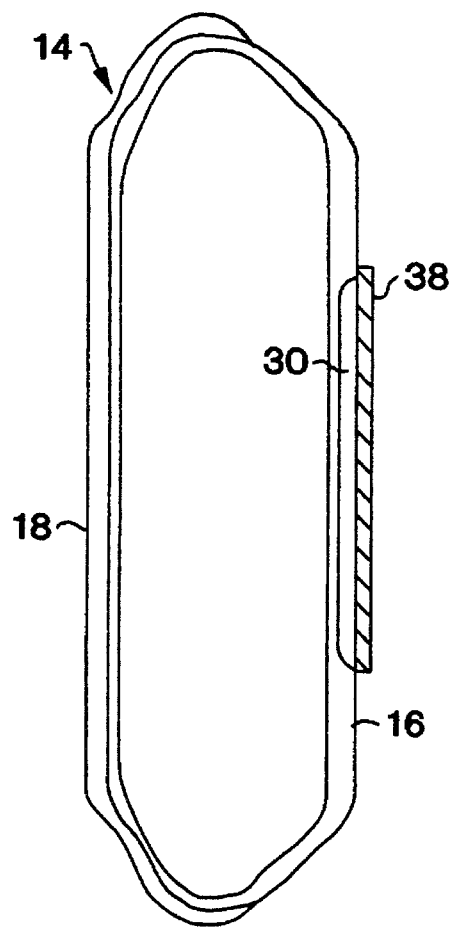
FIG. 2 is a side elevational view of a handle shown in FIG. 1.
Figure 3:
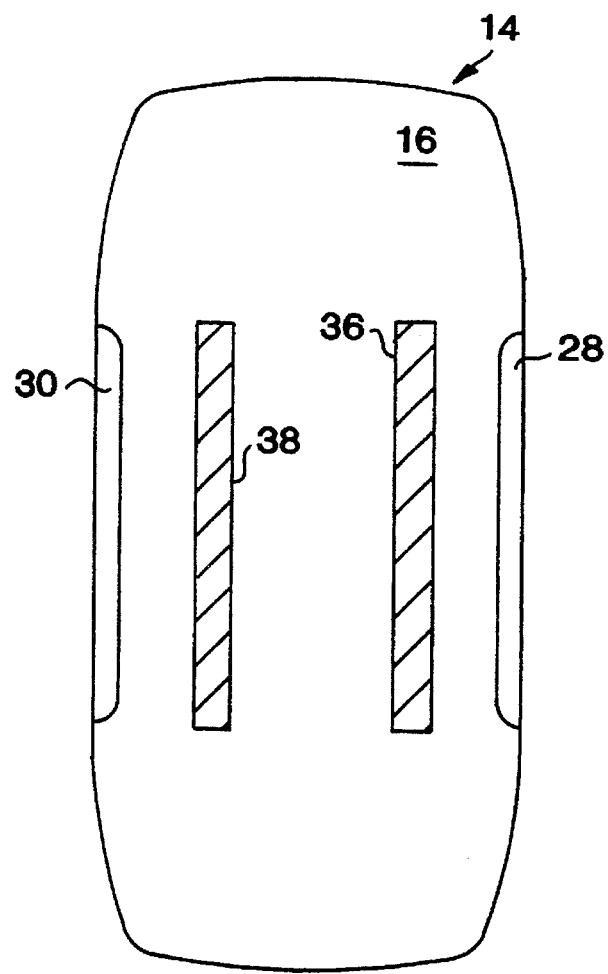
FIG. 3 is a rear elevation view of a handle shown in FIG. 1.

A plastic attachment, or handle, 14 is formed separately from the blow molded plastic PET container body 12. The structure of the handle 14 is shown in FIGS. 1, 2 and 3. The handle 14 is oval-shaped and has a wider back portion 16 than front portion 18. The back portion 16 of the handle 14 is secured to a sidewall 20 of the container shaped to engage the handle. The front portion 16 of the handle 14 which extends away from the container body 12 is narrower than the back portion 16 of the handle 14 for aesthetic purposes, as well as to allow an ultrasonic welding horn 22 (shown in FIGS. 5 and 6) to be placed across the front portion 18 to engage the back portion 16 of the handle.

The container body 12 has two positioning projections, 24 and 26, over which two locating grooves, 28 and 30, on the handle 14 are received. This structure allows for accurate placement of the handle 14 on the container sidewall 20 and prevents skewed handle placement. The container sidewall 20 also has two inwardly depending grooves, 32 best shown in FIGS. 5 and 6. The inwardly depending grooves 32 engage vertical bars, 36 and 38, extending from the rear portion 16 of the handle 14. The vertical bars 36 and 38 and the inwardly depending grooves 32 are the surfaces which mate and are bonded together to form the completed container 10.

The handle 14 is made from PET material, often utilizing in-plant scrap material. Since the handle 14 and the container body 12 are formed from similar polymers, the bond between the container sidewall 20 and the handle 14 is enhanced and creates a more recyclable total package.

Figure 4:
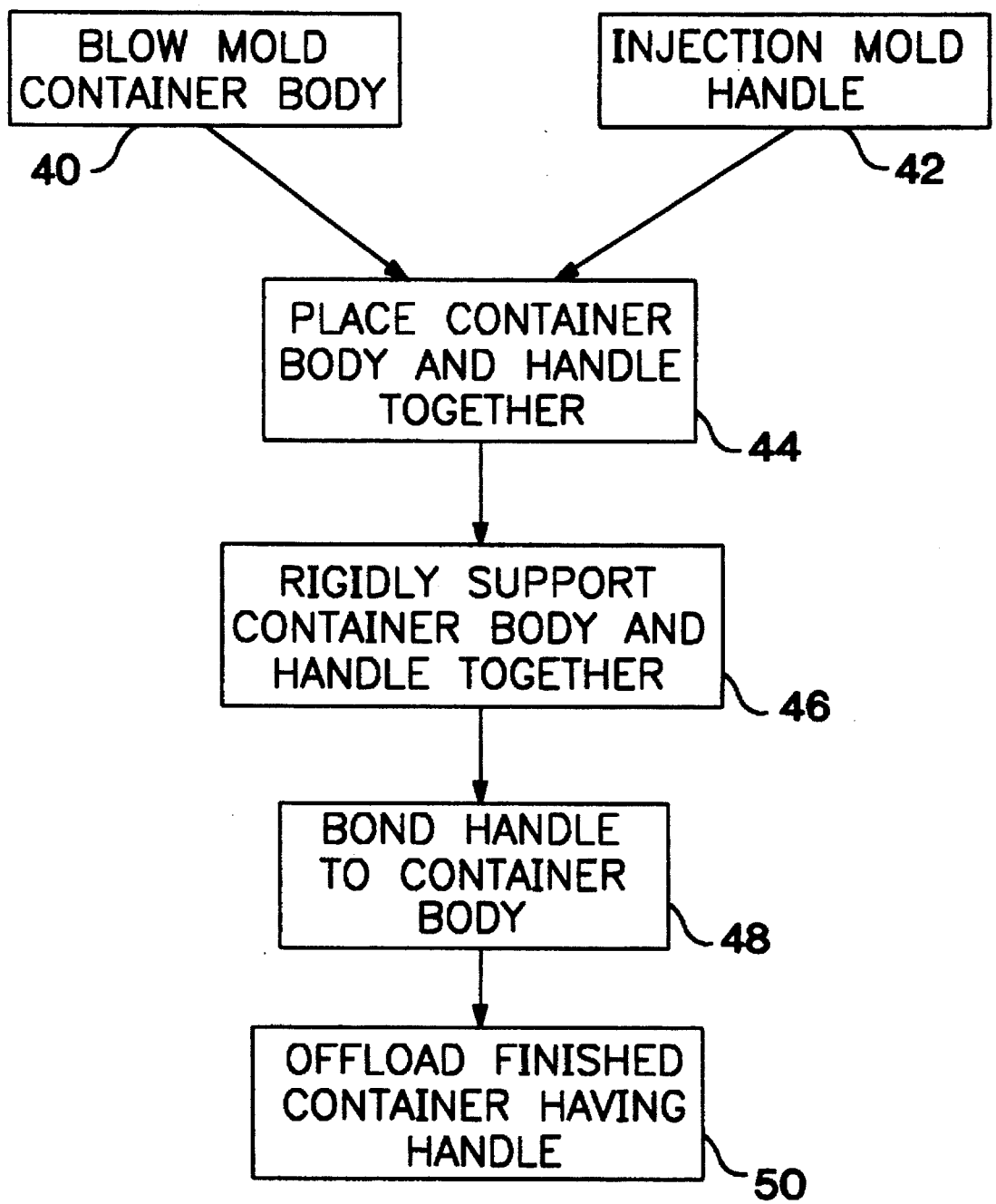
FIG. 4 is a flow chart of the steps of a method embodying the present invention.

Referring to FIG. 4, a process for attaching a separate PET handle 14 to a separate blow molded plastic PET container body 12 is described. The process begins by separately forming a blow molded PET container, step 40, and PET handle, step 42, utilizing known techniques.

The handle 14 is engaged against a portion of an exterior surface of sidewall, step 44. The container sidewall 20 is flexible so that some form of back pressure must be applied to the interior surface 52 (see FIGS. 5 and 6) of the container sidewall 20 in order for an effective bond between the handle 14 and the container sidewall 20 to be formed. Therefore, the next step in the process, step 46, is to apply pressure to rigidly support the interior surface 52 of the container sidewall 20.

An ultrasonic welding horn 22 is employed to vibrate the handle and container body contacting surfaces (i.e. vertical bars 36 and 38 on the handle and the inwardly depending grooves 32 on the containers sidewall) at approximately 20,000 cycles per second to melt the surfaces and form a bond therebetween, step 48. As stated earlier, in order to effect an efficient and strong bond, the sidewall 20 of the container body 12 and the handle 14 must be held together in a rigid fashion. If the container sidewall 20 and the handle 14 are not held rigidly together, the container sidewall 20 will vibrate separately from the handle 14 and no bond, or only a weak bond, will form.

After the handle 14 is welded to the container body 12, the finished model is off loaded, step 50, ready for use, for instance, in a hot-fill process. An effective bond created between the container and the handle provides a bottle capable of structurally accommodating the changes in temperature and pressure in the hot-fill process. The handle attachment is precise, so that no misapplied or skewed handles occur and the aesthetics of the combination provides a superior appearance. The attachment is structurally sound and can be used even with large containers, such as gallon size containers, and support container loads even in the totally filled condition.

As stated earlier, a major problem with ultrasonic welding is that it is not effective on flexible, unsupported surfaces. The sidewall of a blow molded PET plastic container is very flexible. The flexibility is required in order for the container to be used effectively in the hot-fill process. However, an effective bond cannot be created unless there is high contact pressure between the handle and the container sidewall. Normally, the sidewalls of a blown container are too flexible to resist this pressure and no successful bond is achieved.

To overcome this problem, one embodiment of the method of the present invention involves placing a dummy mold 54 around the exterior surface of the container body 12 prior to welding. See FIG. 5. The container sidewall 20 is made rigid by pressurizing the container with air pressure through a valve 56 while the container is constrained by the inner surface of the dummy mold. The dummy mold is strategically designed with a port through which the handle 14, or other attachment device, is inserted. The insertion of the handle or other attachment device effectively seals off the dummy mold 54 from the outside. Therefore, when the ultrasonic welding horns 22 are activated, the air pressure produces sufficient pressure on the interior surface of the container sidewall 20 to allow the weld to be made. A sufficient amount of pressurization has been found to range between 50 psi to 600 psi.

Figure 6:
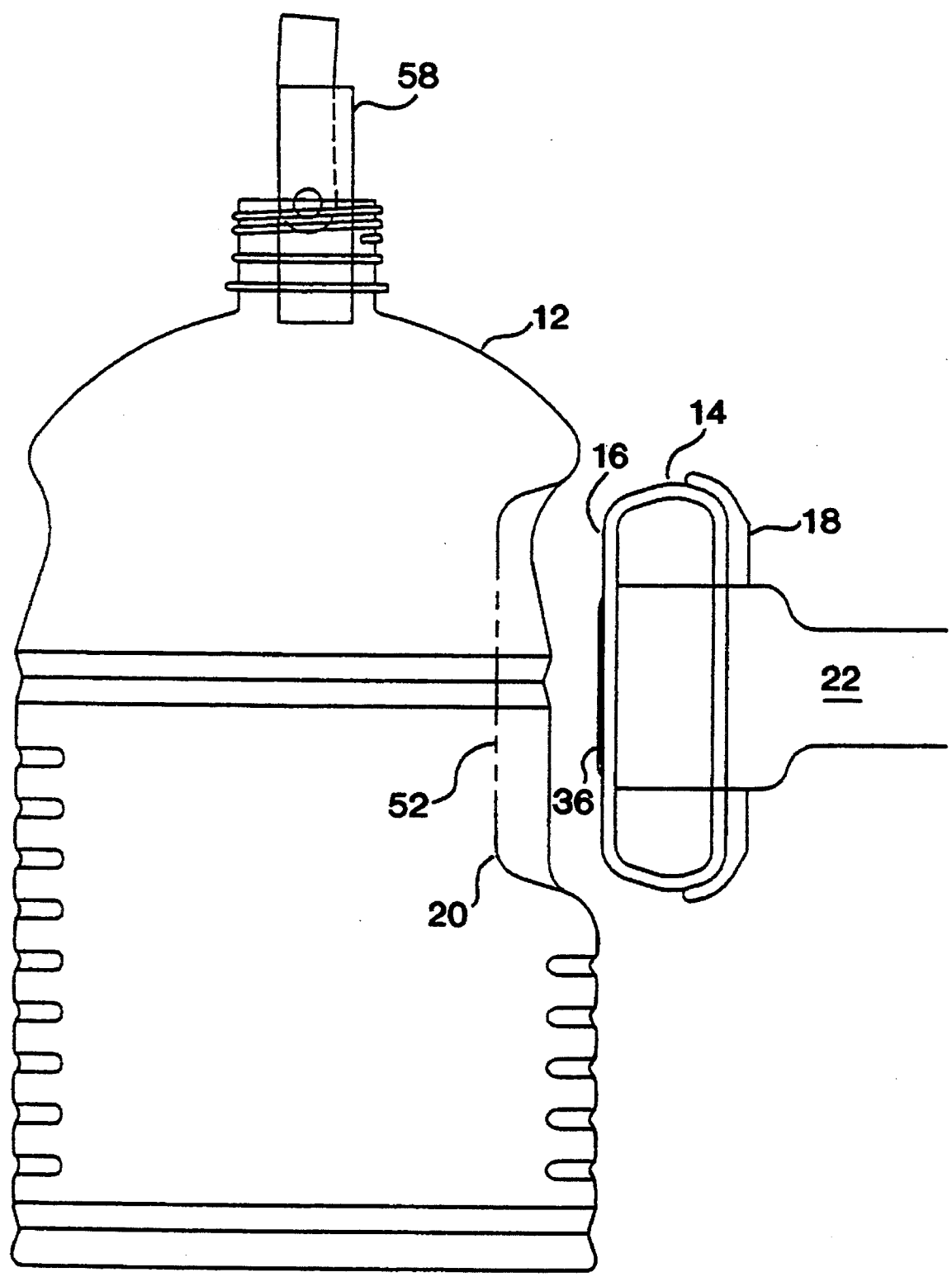
FIG. 6 is an elevational view of an alternate process utilizing a back-stop.
Figure 7:
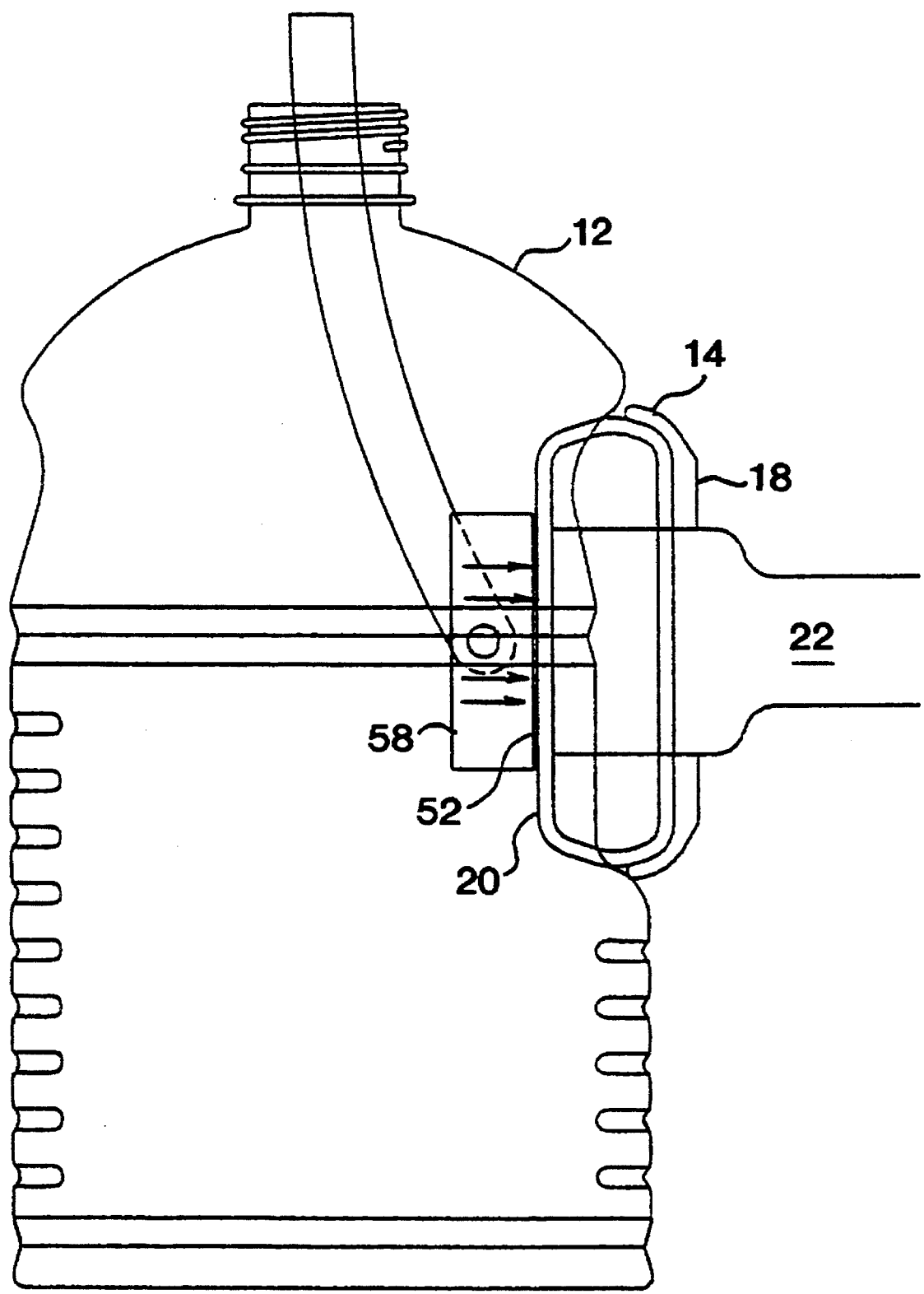
FIG. 7 is an elevational view of the back-stop fully inserted into the container.

A second embodiment for rigidly supporting the interior surface 52 of the container sidewall 20 is shown in FIGS. 6 and 7. A back-stop 58 is inserted through the container opening and extends to support the interior surface 52 of the container sidewall 20 opposite the location of handle placement. With the back-stop 58 in place, the ultrasonic welding horns 22 can be activated and enough pressure is provided by the back-stop 58 to allow a bond to be created.

Figure 5:
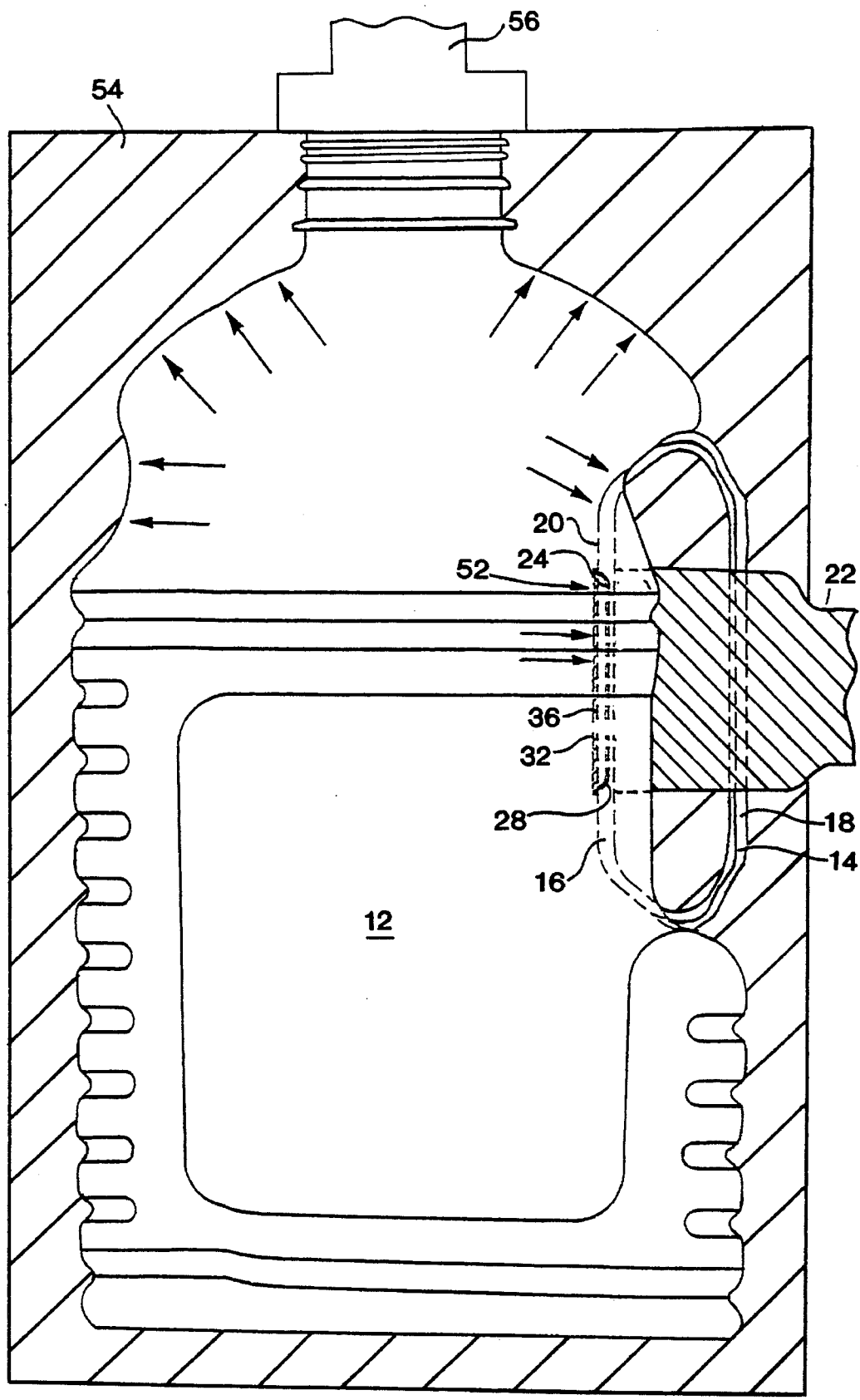
FIG. 5 is an elevational view of a process utilizing a dummy mold.

Another aspect of the invention is the use of an ultrasonic bonding horn 22 as part of a handle delivery and positioning mechanisms. As shown in FIGS. 5, 6 and 7, the placement of the handle 14 is done in conjunction with the positioning of appropriate ultrasonic welding horns 22. The ultrasonic welding horn 22 fits around the front portion 18 of the handle 14 and supports the back portion 16 rigidly to the container sidewall 20.

It is envisioned that the operation of attaching the handle 14 to the container body 12 will take place in a separate machine downstream from the conventional primary blow molding operation. The handle application machine is a shuttle type off-line unit with several dummy molds 54 or back-stop 58. While one of the dummy molds 54 or back-stops 58 is employed in the handle application, another one would be off loading a finished container, and another receiving a new container body. The containers would be control indexed into the dummy molds 54 or control indexed to receive back-stops 58. The molds or back-stops would be then shuttled through the system and returned to the start position to accept the next container.

The described process creates a structurally sound container having a handle. The handle can remain securely attached even in hot-fill processes and throughout shipping and handling. The container has a superior appearance, and the package is completely recyclable. Commercial size quantities of the containers can be produced efficiently, at a minimum of expense, and with quick turnaround time.

While a preferred method and product produced by the method of the present invention has been described in detail, various modifications, alterations, and changes may be made without departing from the spirit and scope of the present invention as defined in the appended claims.

I claim:

1. A method for ultrasonically bonding a separately-formed plastic handle to a blow-molded plastic container having a finish and a sidewall with an exterior surface and an interior surface, the finish being smaller in transverse cross-section than the sidewall to provide a closeable pouring port, comprising the steps of:

juxtaposing the separate plastic handle adjacent the blow-molded plastic container;

engaging the plastic handle against a portion of the exterior surface of the sidewall of the blow-molded plastic container;

engaging an ultrasonic horn against the plastic handle adjacent to said exterior surface portion;

applying pressure against the interior surface of the blow-molded plastic container opposite said exterior surface portion while said ultrasonic horn applies ultrasonic energy to the plastic handle, said pressure applying step includes the step of pressurizing the entire interior surface of the blow-molded plastic container to a level of at least about 50 psi; and confining the exterior surface of the blow-molded plastic container while said pressure is applied to the interior surface;

whereby the plastic handle is ultrasonically bonded to the plastic blow-molded container.

2. A method according to claim 1, wherein said confining is provided by a mold cavity having an inner surface shaped to confine the exterior surface of the plastic container.

3. A method according to claim 2, further comprising the steps of depressurizing the interior surface of the container; and removing the plastic container from said mold cavity.

4. A method according to claim 3, wherein said ultrasonic horn juxtaposes the plastic handle against said exterior surface portion of the plastic container.

5. A method according to claim 4, wherein said mold cavity has a port for receiving said plastic handle and said ultrasonic horn.

6. A method according to claim 5, further comprising the step of making said plastic handle and said blow molded plastic container out of a similar PET material.

7. A method for ultrasonically bonding a separately-formed plastic handle to a blow-molded plastic container having a finish and a sidewall with an exterior surface and an interior surface, the finish being smaller in transverse cross-section than the sidewall to provide a closeable pouring port, comprising the steps of:

juxtaposing the separate plastic handle adjacent the blow-molded plastic container;

engaging the plastic handle against a portion of the exterior surface of the sidewall of the blow-molded plastic container;

engaging an ultrasonic horn against the plastic handle adjacent to said exterior surface portion;

applying pressure against the interior surface of the blow-molded plastic container opposite said exterior surface portion by inserting a back-stop into the fully blown blow-molded plastic container through the finish formed in the container and locating said back-stop adjacent the interior surface of the sidewall of the blow-molded plastic container, and by manipulating said backstop into pressure engagement with the interior surface of the sidewall of the blow-molded plastic container and maintaining said pressure engagement while said ultrasonic horn applies ultrasonic energy;

whereby the plastic handle is ultrasonically bonded to the plastic blow-molded container.

8. A method according to claim 7, wherein said ultrasonic horn is used to engage the plastic handle against the plastic containers.

9. A method according to claim 8, further comprising the step of removing said back-stop from the plastic container.

10. A method of ultrasonic welding a handle onto a side wall of a container, comprising the steps of:

juxtaposing the handle and the container together, the handle being manufactured out of plastic separately from the container, and the container being produced from a blow mold process which completely forms the container with flexible sidewalls and a finish;

aligning the handle relative to the container in a position for attachment;

supporting the handle in an abutting manner in said position for attachment rigidly to an exterior surface portion of said flexible sidewall;

supporting rigidly an interior surface of said flexible sidewall opposite said position of attachment of the handle by placing the container in a mold cavity and pressurizing the interior surface of the container to at least about 50 psi; and welding the handle to the container by activating an ultrasonic welding device while the interior surface of the container is pressurized;

whereby undesirable deflection between said flexible sidewall and the handle is prevented to provide a strong attachment.

11. A method according to claim 10, wherein said ultrasonic welding device is used to deliver, align and support the handle against said flexible sidewall.

12. A method of ultrasonic welding a handle onto a sidewall of a container, comprising the steps of:

juxtaposing the handle and the container together, the handle being manufactured out of plastic separately from the container, and the container being produced from a blow mold process which completely forms the container with flexible sidewalls and a finish;

aligning the handle relative to the container in a position for attachment;

supporting the handle in an abutting manner in said position for attachment rigidly to an exterior surface portion of said flexible sidewall;

supporting rigidly an interior surface of said flexible sidewall opposite said position of attachment of the handle by inserting a back-stop through the finish of the container, and after said insertion, manipulating said back-stop into engagement with said interior surface of said flexible sidewall and maintaining said back-stop against said interior surface; and welding the handle to the container by activating an ultrasonic welding device while said interior surface is supported by said back-stop;

whereby undesirable deflection between said flexible sidewall and the handle is prevented to provide a strong attachment.

* * * * *

UNITED STATES PATENT AND TRADEMARK OFFICE
CERTIFICATE OF CORRECTION

PATENT NO. : 5,622,579
DATED : April 22, 1997
INVENTOR(S) : John W. Tobias and Frank E. Semersky It is certified that error appears in the above-indentified patent and that said Letters Patent is hereby corrected as shown below:

On the Title page, item [75] Inventor, please add:

--;Frank E. Semersky, Toledo, Ohio--.

Signed and Sealed this

Eighth Day of July, 1997

Attest:

BRUCE LEHMAN

Attesting Officer

Commissioner of Patents and Trademarks